（12）United States Patent
Smith

(10) Patent No.: US 10,141,982 B2
(45) Date of Patent: Nov. 27, 2018

(54) RFID PROTOCOLS WITH NON-INTERACTING VARIANTS

(71) Applicant: Ruizhang Technology Limited Company, Shanghai (CN)

(72) Inventor: John Stephen Smith, San Jose, CA (US)

(73) Assignee: RUIZHANG TECHNOLOGY LIMITED COMPANY, Shanghai (CN)

( * ) Notice: Subject to any disclaimer, the term of this patent is extended or adjusted under 35 U.S.C. 154(b) by 0 days.

(21) Appl. No.: 14/878,996

(22) Filed: Oct. 8, 2015

(65) Prior Publication Data

US 2016/0197652 A1    Jul. 7, 2016

Related U.S. Application Data

(63) Continuation of application No. 13/730,366, filed on Dec. 28, 2012, now Pat. No. 9,158,948.

(60) Provisional application No. 61/589,222, filed on Jan. 20, 2012.

(51) Int. Cl.
*H04W 12/06*  (2009.01)
*H04B 5/00*  (2006.01)
*G06K 7/10*  (2006.01)
*G06K 7/01*  (2006.01)
*H04W 12/04*  (2009.01)

(52) U.S. Cl.
CPC ............. *H04B 5/0062* (2013.01); *G06K 7/01* (2013.01); *G06K 7/10019* (2013.01); *G06K 7/10257* (2013.01); *H04W 12/06* (2013.01); *H04W 12/04* (2013.01)

(58) Field of Classification Search
CPC ............ G06Q 20/3278; G06Q 20/3821; H04L 63/0428
USPC ...................................................... 340/10.5
See application file for complete search history.

(56) References Cited

U.S. PATENT DOCUMENTS

| | | |
|---|---|---|
| 5,266,925 A | 11/1993 | Vercellotti et al. |
| 5,883,582 A | 3/1999 | Bowers et al. |
| 6,072,801 A | 6/2000 | Wood, Jr. et al. |
| 6,100,804 A | 8/2000 | Brady et al. |
| 6,942,155 B1 | 9/2005 | Stewart et al. |
| 7,215,251 B2 | 5/2007 | Hyde |
| 7,259,654 B2 | 8/2007 | Littlechild et al. |
| 7,262,686 B2 | 8/2007 | Stewart et al. |
| 7,391,329 B2 | 6/2008 | Humes et al. |
| 7,710,798 B2 | 5/2010 | Pillai |
| 7,716,160 B2 | 5/2010 | Smith et al. |

(Continued)

FOREIGN PATENT DOCUMENTS

CN    1771626    5/2006

OTHER PUBLICATIONS

English translation of Search Report for Chinese Patent Application No. 201310086335.5, dated Jul. 25, 2016, 4 pages.

(Continued)

*Primary Examiner* — Vernal U Brown
(74) *Attorney, Agent, or Firm* — Womble Bond Dickinson (US) LLP

(57) ABSTRACT

In an RFID system having at least one tag and at least one reader, a tag and a reader can, in one embodiment, use a pair of keys, known to both the tag and the reader, to restrict the interaction of the tag and the reader so that tags having the pair of keys interact only with readers that use the pair of keys.

18 Claims, 8 Drawing Sheets

(56) References Cited

U.S. PATENT DOCUMENTS

| | | | |
|---|---|---|---|
| 7,716,208 B2 | 5/2010 | Smith et al. | |
| 8,102,244 B2 | 1/2012 | Smith | |
| 8,112,626 B1* | 2/2012 | Adler | H04L 9/3271 |
| | | | 380/46 |
| 8,154,405 B2 | 4/2012 | Gravelle et al. | |
| 8,742,899 B2 | 6/2014 | Smith | |
| 2004/0046642 A1 | 3/2004 | Becker et al. | |
| 2005/0092845 A1 | 5/2005 | Forster | |
| 2005/0263591 A1 | 12/2005 | Smith | |
| 2007/0069852 A1* | 3/2007 | Mo | H04L 9/3271 |
| | | | 340/5.1 |
| 2008/0309490 A1 | 12/2008 | Honkanen et al. | |
| 2009/0096584 A1* | 4/2009 | Gravelle | G06F 21/606 |
| | | | 340/10.1 |
| 2010/0060927 A1* | 3/2010 | Ichikawa | G06K 7/0008 |
| | | | 358/1.15 |
| 2010/0073147 A1 | 3/2010 | Guajardo Merchan et al. | |
| 2012/0249303 A1 | 10/2012 | Hadley et al. | |

OTHER PUBLICATIONS

First Office Action for Chinese Patent Application No. 201310086335. 5, dated Aug. 4, 2016, 19 pages.
Second Office Action for Chinese Patent Application No. 201310086335. 5, dated Apr. 14, 2017, 16 pages.

* cited by examiner

RFID PROTOCOLS WITH NON-INTERACTING VARIANTS

CROSS-REFERENCE

This present application is a continuation of co-pending U.S. patent application Ser. No. 13/730,366, filed on Dec. 28, 2012, which claims the benefit of U.S. Provisional Application Ser. No. 61/589,222, filed on Jan. 20, 2012, and this provisional application is hereby incorporated herein by reference.

BACKGROUND OF THE INVENTION

The present invention relates generally to the field of radio frequency identification (RFID) devices or tags and specifically to RFID devices which provide distinct non-interacting protocol variants to minimize interactions between RFID devices used for different purposes.

RFID transponders (commonly referred to herein as "tags") in the form of labels, inlays, straps or other forms are widely used to associate an object with an identification code. Tags generally include one or more antennas with analog and/or digital electronic circuits that include communications electronics (such as an RF transceiver), data memory (for storing one or more identification codes), processing logic (such as a microcontroller) and one or more state storage devices. Examples of applications that can use RFID tags include luggage tracking, inventory control or tracking (such as in a warehouse), parcel tracking, access control to buildings or vehicles, etc.

There are three basic types of RFID tags. A passive tag is a beam powered device which rectifies energy required for operation from radio waves generated by a reader. For communication, the passive tag creates a change in reflectivity of the field which is reflected to and read by the reader. This is commonly referred to as continuous wave backscattering. A battery-powered semi-passive tag also receives and reflects radio waves from the reader; however a battery powers the tag independent of receiving power from the reader. An active tag, having an independent power supply, includes its own radio frequency source for transmission.

The reader, sometimes referred to as an interrogator, includes a transmitter to transmit RF signals to the tag and a receiver to receive tag modulated information. The transmitter and receiver can be combined as a transceiver which can use one or more antennas. Communications between a reader and tag is defined by an air interface protocol, such as (without limitation):

(i) EPCglobal's EPC Radio-Frequency Identity Protocols Class-1 Generation-2 UHF RFID Protocol for Communications at 860 MHz-960 MHz, version 1.2.0 (http://www.epcglobalinc.org/) (hereinafter referred to as the "UHF Gen2 standard");

(ii) adaptations of the UHF Gen2 standard for operation at high frequency ("HF"), for example at 13.56 MHz; and (iii) ISO/IEC 18000-6 Information technology—Radio frequency identification for item management—Part 6: Parameters for air interface communications at 860 MHz to 960 MHz, Amendment 1: Extension with Type C and update of Types A and B. Each of the above protocols is incorporated herein by reference for all purposes.

Multiple wireless tags can be interrogated by sending a code from an interrogating transmitter (e.g., a reader) and having information transmitted by the tag in response. This is commonly accomplished by having the tag listen for an interrogation message and for it to respond with a unique serial number and/or other information. The tags typically have limited power available for transmitting data wirelessly to the reader. It is desirable to extend the range of wireless tags so that it is not necessary to bring each tag close to a reader for reading. However, when the range of the reading system is extended, many tags will be within the range of the interrogating system so that their replies may corrupt each other.

Prior art attempts to avoid collisions when reading multiple RF tags are described in U.S. Pat. Nos. 5,266,925; 5,883,582; 6,072,801; and 7,716,208. However, these prior art approaches provide a protocol in which readers for each of these protocols interact with all tags using that same protocol. Often this is desirable, leading to standardized tags and readers which can allow users of RFID systems to purchase components of systems from many different providers, and read tags which come from many different sources or suppliers of goods.

In some cases, however, it is desired by users of RFID systems to have tags and readers which do not interact outside a specific use model. For example, launderers of clothing for industrial health, or clean room garments may want to use low cost, standardized RFID tags, readers, and systems, but do not desire to have their workers wearing the clothes tracked by RFID readers installed in stores to track products in the store's inventory. It is therefore desirable to have low cost standardized RFID products which are nonetheless non-interacting with other RFID systems, tags, and readers.

SUMMARY OF THE DESCRIPTION

Methods and apparatuses to identify tags are described herein. Some of the embodiments of the present invention are summarized in this section.

Embodiments of the present invention include systems with readers and tags in which a reader queries the tags with a key parameter which the tags use to decide whether to participate, and, in one embodiment, a parameter that specifies a level of probability of reply according to which the tags individually and randomly decide whether or not to reply. In another embodiment, a reply from the tag is further encoded with a second key. In another embodiment, the tags can remember the parameters used in a query so that a short form of the query command can be used to repeat the query with the same query parameters.

In one aspect of the present invention, a method for querying a plurality of tags includes broadcasting a first query command with a first value of a key parameter, a first value of a probability parameter (such as a Q value in the Q protocol described in U.S. Pat. No. 7,716,208), where the first value of the key parameter determines whether the tag will participate, and the first value of the probability parameter indicates a first probability of reply according to which each of the plurality of tags randomly determines whether or not to reply, and detecting a reply in response to the first query command. In one embodiment, in response to a legible reply to the first or subsequent query command, which reply includes first handshaking data, a reader further sends a second command including an encoded value based on the first handshaking data and a second key value and receives tag identification data as a reply to the second command if the encoding corresponds to the encoding set for that particular tag.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. The processing logic may consist of a finite state machine, or several interconnected finite state machines. Although the processes are described below in terms of some sequential operations, it should be appreciated that some of the operations described may be performed in a different order. Moreover, some operations may be performed in parallel rather than sequentially.

RFID methods and tags and readers which use keys, in one embodiment, to control the interaction between tags and readers are described. The keys can ensure that only certain sets of readers and tags will interact through one or more RFID protocols while other readers or tags will not interact through those RFID protocols. The RFID protocols can be any one of a variety of different protocols and can be either non-standards based or standards based, such as the UHF Gen2 standard or the ISO/IEC 18000-6 RFID standard referred to herein. Certain RFID protocols are also described in U.S. Pat. Nos. 7,716,208 and 7,262,686, which are both incorporated herein by reference, and in U.S. Patent Application Publication No. 2005/0263591 (which is application Ser. No. 10/915,725 filed on Aug. 9, 2004) which is also incorporated herein by reference.

Figure 1:
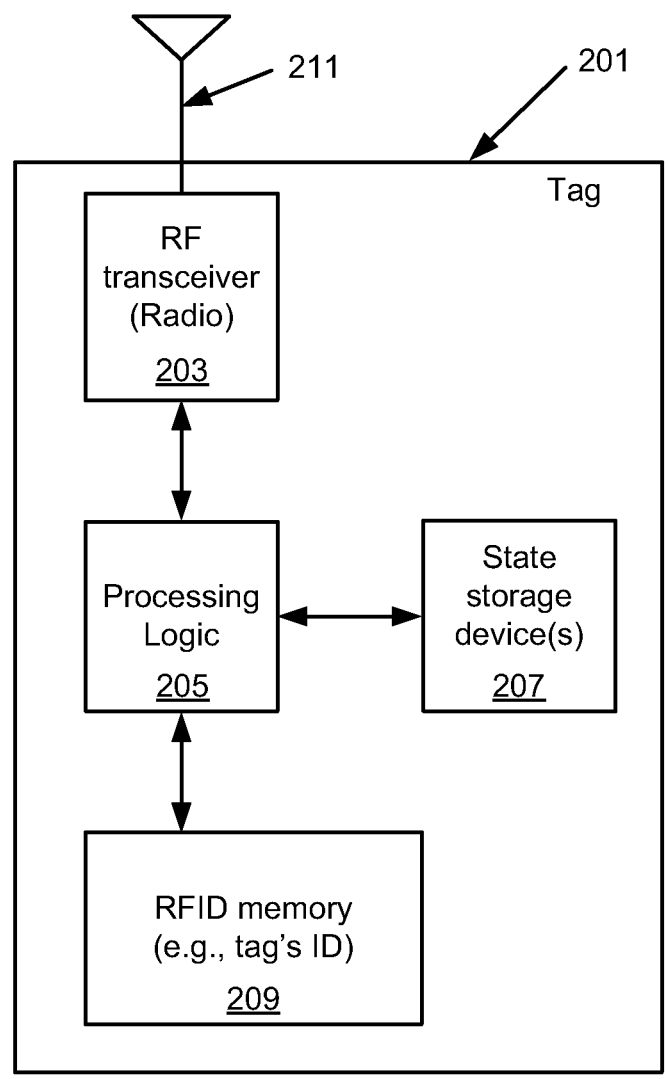
FIG. 1 shows a block diagram of an RFID transponder according to one embodiment of the present invention.

FIG. 1 provides a block level representation of an RFID transponder according to one embodiment of the present invention. The tag or transponder 201 includes one or more antennas, such as antenna 211 which, in one embodiment, can be a dipole antenna, a t-match meandered antenna with end loading, or a loop antenna or other antennas known in the art. The tag 201 can be a passive tag. The antenna 211 is coupled to an RF transceiver 203 which provides a radio circuit including both a transmitter and a receiver. The receiver receives signals from an RFID reader, such as the RFID reader shown in FIG. 2 and the transmitter of the transceiver 203 transmits signals to an RFID reader, such as the RFID reader shown in FIG. 2. The RF transceiver 203 is coupled to processing logic 205 which can be implemented in a variety of different ways, including a microcontroller or a programmable logic device, or an ASIC control circuitry, etc. Processing logic 205 is coupled to the RFID memory 209 and is coupled to the state storage device 207. Tag 201 can include one or more state storage devices 207 to store one or more states, each having at least one bit for a particular state. Each state storage device 207 can include one persistent node that retains a state even when no power is available in the transponder. In one embodiment, the tag 201 can include four state storage devices 207, each receiving a separate control signal to control its respective switch, the control signals being provided by processing logic 205 as is known in the art. Examples of circuits which can implement the state storage devices 207 are provided in U.S. Pat. Nos. 6,942,155; 7,259,654; 7,710,798; 7,215,251; and U.S. patent application Ser. No. 12/420,009, filed on Apr. 7, 2009. RFID memory 209 can be non-volatile memory such as a mask read-only memory (ROM), electrically erasable (EE) programmable read only memory, or flash memory or other non-volatile memory which can store information for the transponder, such as the tag's identification number or identification code and other information as is known in the art. Processing logic 205 can retrieve the data from RFID memory 209 according to the various protocols under which the tag can operate and can transmit those identification values to a reader through the RF transceiver 203 as is known in the art.

Figure 2:
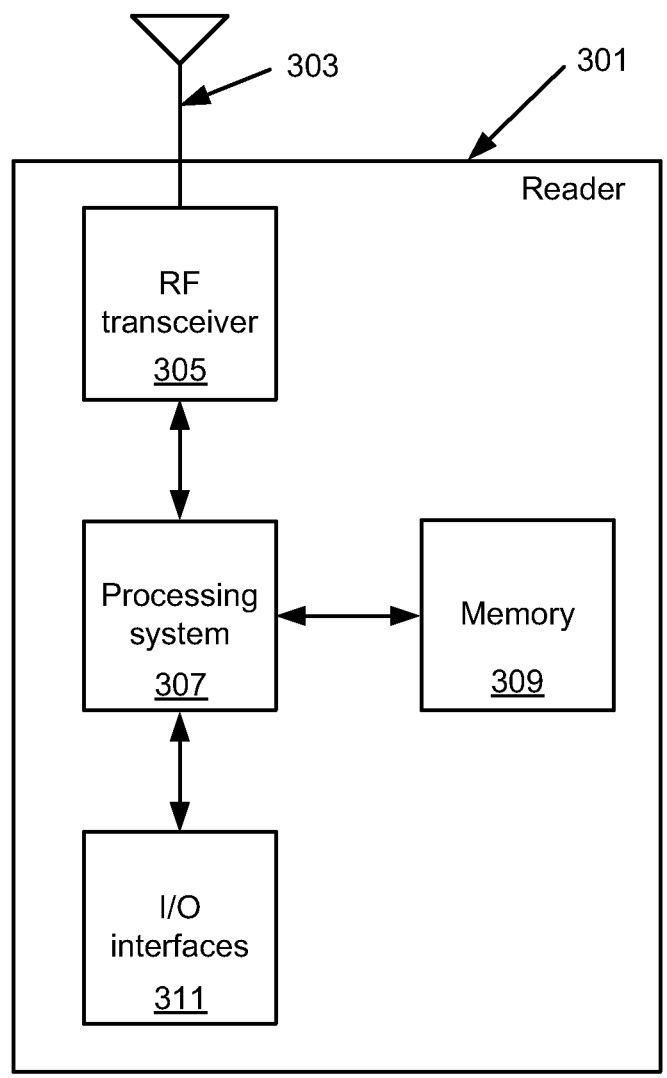
FIG. 2 shows an example of an RFID reader which can be used with an RFID transponder described herein.

FIG. 2 shows an example of an RFID reader which can operate with any one of the RFID transponders described herein. For example, the reader shown in FIG. 2 can operate with the tag 201. Reader 301 can include one or more antennas, such as antenna 303, which is coupled to an RF transceiver 305 as is known in the art. The RF transceiver 305 can be coupled to a processing system 307 which in turn is coupled to memory 309 and to input/output interfaces 311 as is known in the art. The input/output interfaces 311 can provide an interface to other systems such as computers or other devices which are coupled to the reader 301 in order to receive data from the tags queried by the reader 301. The RF transceiver 305 can operate in conjunction with processing system 307 as is known in the art to implement any one of the known protocols for communicating with RFID tags such as the EPC global protocol referred to above or the ISO/IEC protocol referred to above or other protocols.

Figure 3:
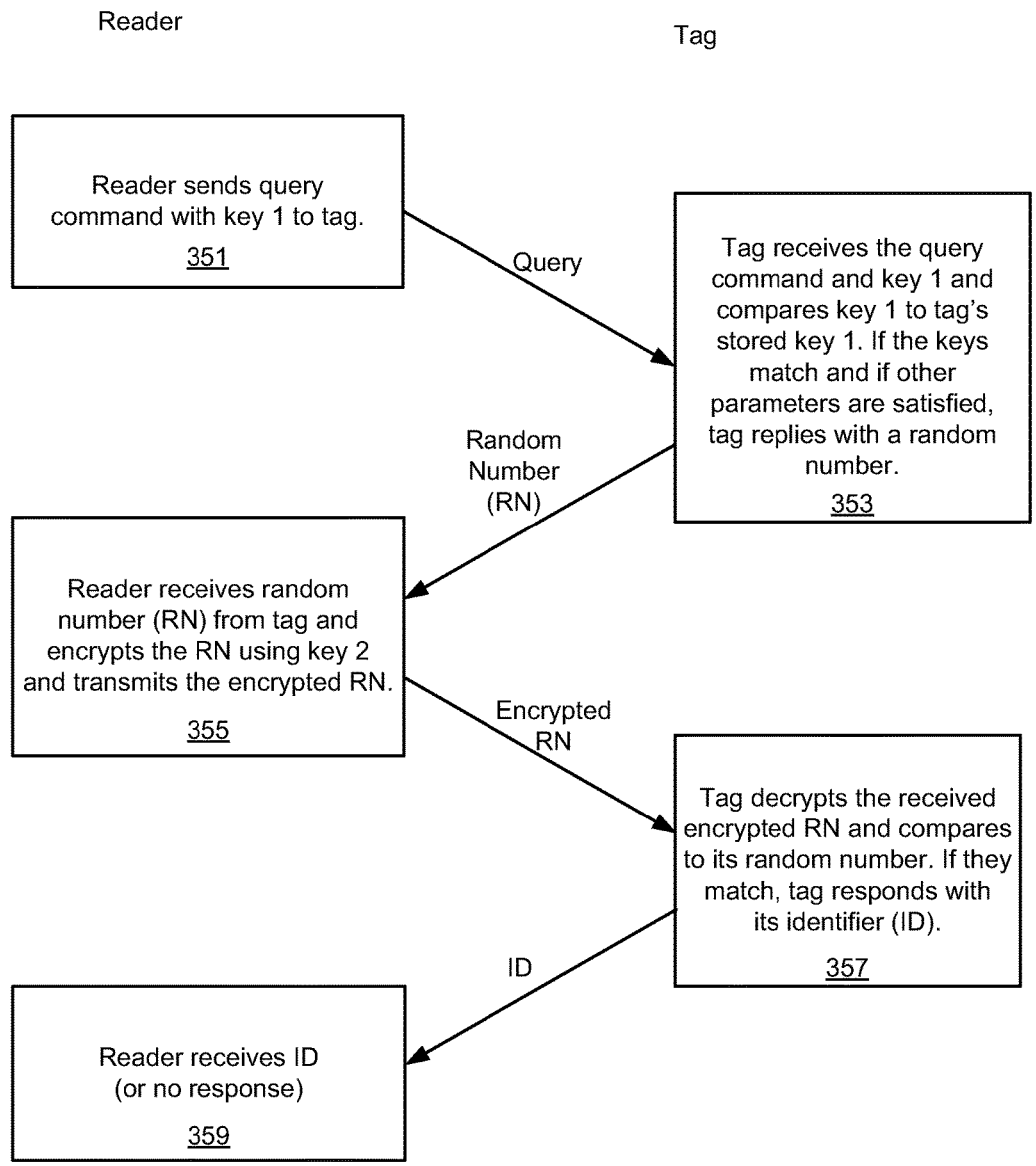
FIG. 3 is a flow diagram showing a method according to one embodiment of the present invention.

FIG. 3 shows an example of a method in a system with a tag (also referred to as a transponder) and a reader. It will be understood that multiple tags can be present in the field of one or more readers. In the method shown in FIG. 3, it is assumed that the readers and tags that are configured to interact with each other according to the method shown in FIG. 3 will have knowledge of a pair of keys referred to as key 1 and key 2; in other words, a user of an RFID system can have readers and tags manufactured or otherwise configured so that they each know and store the pair of keys so that they can interact as shown in FIG. 3. For those tags that do not store or otherwise know the keys, they will not be able to interact, in the manner shown in FIG. 3, with readers that expect tags to have stored the pair of keys. Thus, these tags can be considered non-interacting variants that will not respond to readers that expect the use of the pair of keys in the manner shown in FIG. 3. Moreover, readers that do not store or otherwise know the pair of keys will not be able to interact, in the manner shown in FIG. 3, with tags that expect to use the pair of keys as shown in FIG. 3. Thus, these readers can be considered non-interacting variants that will not be able to interact with tags that expect the use of the pair of keys in the manner of FIG. 3. Thus, the use of the pair of keys by a set of readers and tags effectively creates a sub-selection of a population of readers and tags, wherein the sub-selection is only the set of readers and tags configured to use the pair of keys in the manner shown in FIG. 3 or in variations of that manner.

It will be understood that the method of FIG. 3 can be performed in conjunction with a standards based (e.g. the EPC UHF Gent standard) protocol or a non-standards based protocol or portions of those protocols. For example, the method of FIG. 3 can be performed in conjunction with a protocol that uses a Q parameter and/or sessions as described in U.S. Pat. No. 7,716,208 or as described in U.S. patent application Ser. No. 10/915,725, filed on Aug. 9, 2004.

Now referring to FIG. 3, a reader (such as reader 301) in operation 351 can begin the method by sending a query command with a first key ("key 1") in the pair of keys that is known to both the reader and the tag; the first key can be sent as part of the query command or before or after sending the query command. Any tags in the field of the reader can receive this query command and key 1 but only those tags that have stored the matching value of key 1 will be able to respond as will be explained. The tag, such as tag 201, in the field of the reader receives the query command and the key 1 in operation 353 and compares the value of the received key 1 to its stored value for its key 1. Each reader and tag that implements a method that is based on FIG. 3 can have and store at least one pair of keys, one that acts as a key 1 (sent from the reader to the tag) and the other that acts as key 2 and is used to encrypt (in the reader) or decrypt (in the tag) a value, such as a random number. It will be appreciated that a tag or a reader can have multiple pairs of keys such that a tag (having multiple pairs) can be able to interact with different readers each of which has one of those multiple pairs, and similarly a reader (having multiple pairs) can be able to interact with different tags each of which has only one of those multiple pairs of keys. If, in operation 353, the tag determines that the value of received key 1 matches the value of the tag's stored key 1 (or matches the value of any of its stored key 1's), then the tag can proceed to decide whether to respond to the reader (but if there is no match, then the tag decides immediately to not respond to the reader). In one embodiment the tag can, once it determines that the keys match, process other parameters (such as the Q parameter and the sessions parameters) to determine whether to respond. If all of the other parameters are satisfied (indicating a response), then the tag can reply to the reader with, in one embodiment, a random number (such as a random 16-bit value) or with some other value. The processing of the other parameters (such as the Q parameter) can be part of a standards based or non-standards based protocol (e.g. the EPC UHF Gen2 standard referred to above).

In operation 355, the reader receives the transmission (e.g. through a backscatter from the tag) of the random number (or other value) from the tag and then encrypts the random number using an encryption and decryption algorithm known and used by both the tag and the reader. The encryption algorithm uses key 2, which is the second key in the pair of keys known to both the tag and the reader, to encrypt the random number (or other value). The encrypted random number (or other value) is then transmitted by the reader, in operation 355, to the tag. This transmission (of the random number) can be part of an ACK (acknowledgement) or handshake, such as the ACK or handshake described in U.S. Pat. No. 7,716,208 or in U.S. patent application Ser. No. 10/915,725 filed on Aug. 9, 2004, both of which are incorporated herein by reference. The tag in operation 357 receives the encrypted random number (or other value) and attempts to decrypt it with its copy of key 2. The decrypted value should be the random number transmitted in operation 353 and if it is, then a match is indicated and the tag can then respond to the reader with information, such as its identification value (e.g. an RFID value, etc.). If there is no match, then the tag decides to either not respond to the reader or respond with other information (such as a void or null value or access denied signal, etc.). If the tag responds in operation 357, then the reader receives a response, such as the tag's one or more identification values in operation 359. It will be appreciated that a "match" between two values means that they are the same (e.g. 5=5) or that they have some predetermined relationship which is treated as a match (e.g. n and 2n where the predetermined relationship is one value is twice the other).

Figure 4:
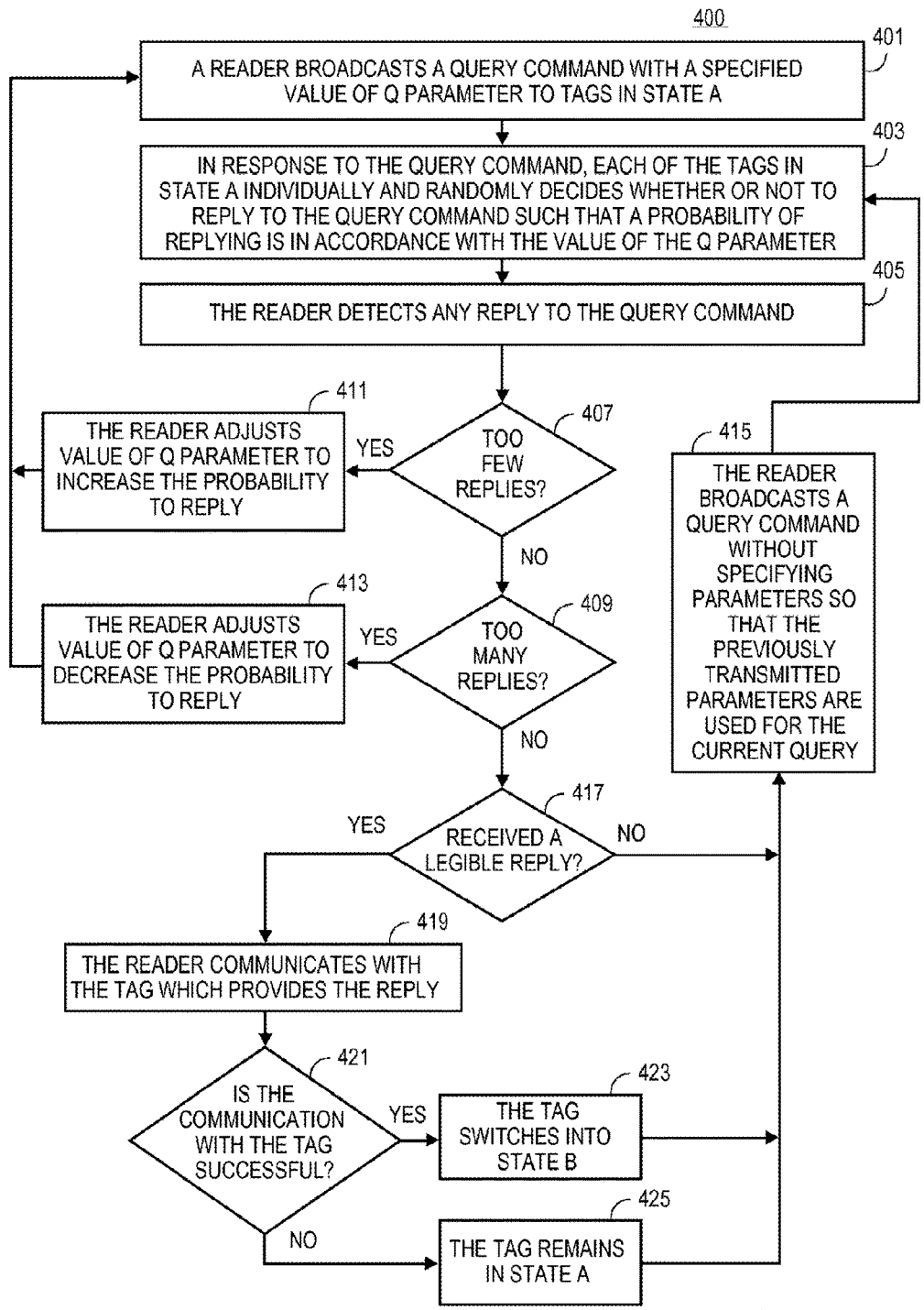
FIG. 4 is a flowchart showing a communication method according to one embodiment of the present invention.

FIG. 4 illustrates a flowchart representation of a communication method according to one embodiment of the present invention. A Reader broadcasts a query command with a specified value of Q parameter to Tags in state A (401). In response to the query command, each of the Tags in state A individually and randomly decides whether or not to reply to the query command such that a probability of replying is in accordance with the value of the Q parameter (403). Tags in state B do not reply to the query command which is for tags in state A. The Reader then detects any reply to the query command (405). It is determined whether there are too few replies (407). For example, when the Reader obtains no reply for a number of query commands with the specified value of Q parameter, the Reader may determine that the specified level of probability to reply is too low and there are too few replies. When there are too few replies, the Reader adjusts the value of Q parameter to increase the probability to reply (411). Similarly, it is determined whether there are too many replies (409). When there are too many replies, the replies from different Tags corrupt each other. Thus, the Reader adjusts the value of Q parameter to decrease the probability to reply when there are too many replies. If no legible reply is received (417), the Reader broadcasts a query command without specifying parameters so that the previously transmitted parameters are used for the current query (415). Since the same parameters for the query are not transmitted again, it is faster to issue the query command to repeat the previous query than to issue the query command with all the parameters. In response to the new query command, each of the Tags in state A then individually and randomly decides whether or not to reply to the query command such that a probability of replying is in accordance with the value of the Q parameter (403).

When the value of Q parameter is adjusted to a suitable value, the probability of obtaining one legible reply from a large number of Tags will be high. Thus, the Reader can simply repeat the previous query without adjusting query parameters until there are too few (or too many) replies.

When one legible reply is received (417), the Reader communicates with the Tag which provides the reply (419). In one embodiment of the present invention, the reply from the Tag includes data that identifies the Tag so that the Reader can address the Tag that provides the legible reply. In one embodiment, a Tag generates a random number for the purpose of handshaking with the Reader. During the communication with the Tag, the Reader obtains Tag Identification data from the Tag. If the communication with the Tag is successful (421), the Tag switches from state A into state B (423); otherwise, the Tag remains in state A (425). Once the Tag is in state B, the Tag does not respond to the query for Tags in state A. Thus, the Reader can communicate with the Tags in state A one at a time until all Tags are in state B.

In one embodiment of the present invention, the operations with respect to state A and state B are symmetric. For example, the Reader can broadcast a query command with a specified value of Q parameter to Tags in state B. In response to the query command for Tags in state B, each of the Tags in state 13 individually and randomly decides whether or not to reply to the query command such that a probability of replying is in accordance with the value of the Q parameter. Tags in state A do not respond to the query for Tags in state B. If the communication with the Tag in state B is successful, the Tag switches from state B into state A; otherwise, the Tag remains in state B. Thus, the Reader can sort the Tags from state A into state B one at a time, or sort the Tags from state B into state A one at a time.

Alternatively, the operations with respect to state A and state B may be non-symmetric. For example, the Reader can sort the Tags from state A into state B one at a time but not from state B into state A one at a time. In such an implementation, the Reader can first place the Tags into state A before starting to read Tag data from Tags one at a time.

Figure 5:
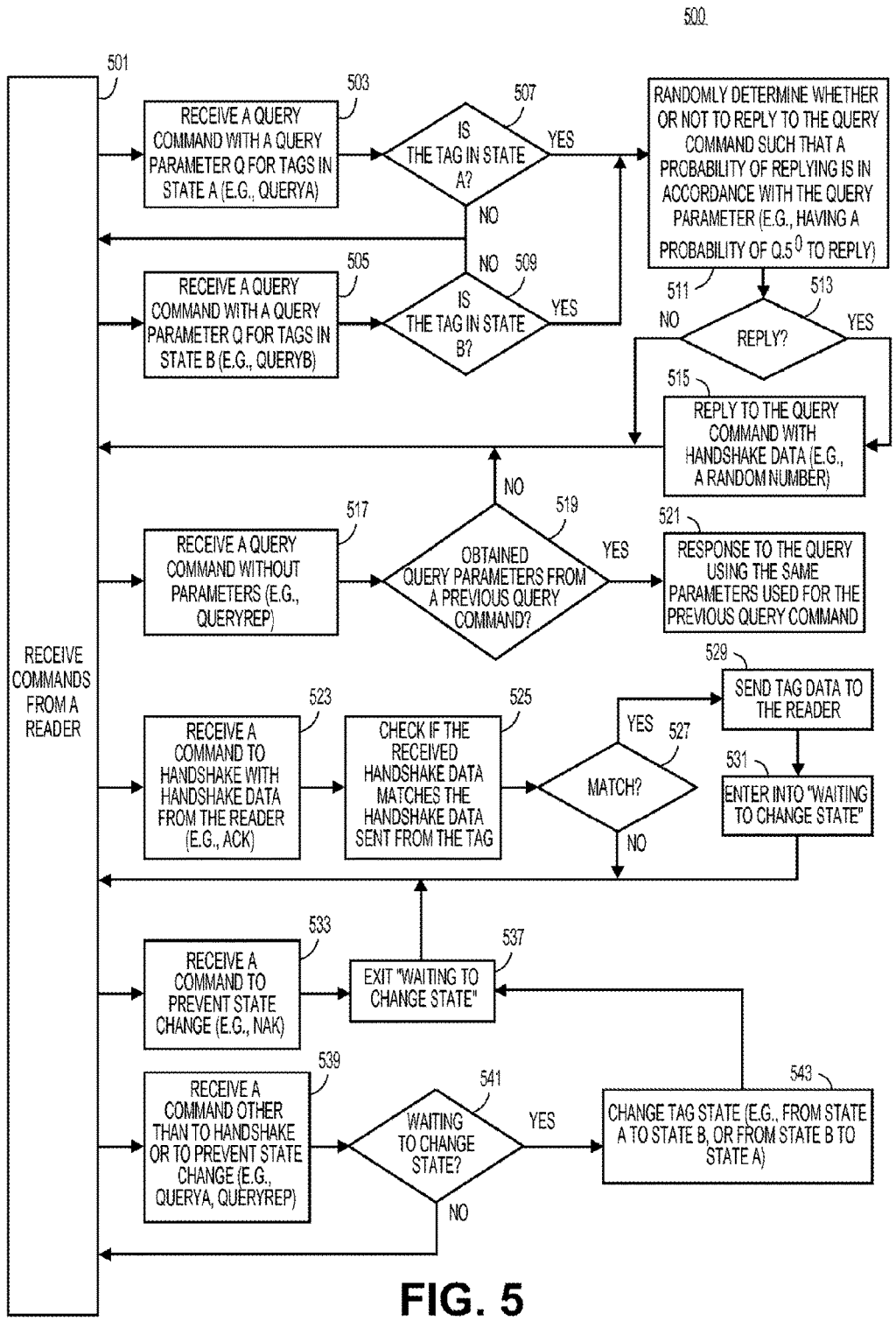
FIG. 5 is a flowchart showing a method for a Tag to communicate with a Reader according to one embodiment of the present invention.

FIG. 5 illustrates a flowchart representation of a method for a Tag to communicate with a Reader according to one embodiment of the present invention. In operation 501, the Tag receives commands from a Reader. After receiving a query command with a query parameter Q for Tags in state A (e.g., QueryA) (503), the Tag determines if it is in state A (507). If the Tag is not in state A, the Tag does not reply to the query for Tags in state A.

Similarly, after receiving a query command with a query parameter Q for Tags in state B (e.g., QueryB) (505), the Tag determines if it is in state B (507). If the Tag is not in state B, the Tag does not reply to the query for Tags in state B.

If the query matches the state of the Tag (e.g., the Tag in state A receives a query for Tags in state A or the Tag in state B receives a query for Tags in state B), the Tag randomly determines whether or not to reply to the query command such that a probability of replying is in accordance with the query parameter (e.g., having a probability of $0.5^Q$ to reply). If the Tag decides to reply (513), the Tag replies to the query command with handshake data (e.g., a random number).

When the Tag receives a query command without parameters (e.g., QueryRep) (517), it is determined whether the Tag obtained query parameters from a previous query command (519). If the Tag has the query parameters from a previous query command (e.g., a previous QueryA or QueryB command), the Tag responds to the query using the same parameters that were used for the previous query command (521). For example, if the previous query command is for Tags in state A, the current query command without parameters is also for Tags in state A. Thus, operation 507 is performed to check if the query is intended for the Tag. Similarly, if the previous query command is for Tags in state B, the current query command without parameters is also for Tags in state B so that operation 509 is performed. The Q parameter used in processing the previous query command is also used for the processing of the current query command without parameters. In one embodiment of the present invention, when a suitable value of Q parameter is reached, the Reader issues many query commands without parameters to repeat the query of the same parameters. Since the query command without parameters is quick to transmit (and quick to process), the time to process a large number of Tags can be shortened using such a query command without parameters.

When the Tag receives a command to handshake with handshake data from the Reader (e.g., Ack) (523), the Tag checks if the received handshake data matches the handshake data sent from the Tag (525). If the handshake data do not match (527) (e.g., the handshake command is not in response to a reply sent from the Tag or the handshake data received from the Reader is different from the handshake data sent from the Tag), the Tag does not reply. Otherwise, the Tag sends Tag data (e.g., ePC) to the Reader (529) and enters into "waiting to change state" (531). In one embodiment, the Tag assumes that the Reader receives the Tag data unless the Reader transmits a command to indicate that the Tag data is not received. For example, when the Tag receives a command to prevent state change (e.g., NAk) (533), the Tag exits "waiting to change state" (537). When the Tag receives a command other than to handshake or to prevent state change (e.g., receiving QueryA, QueryB or QueryRep) (539), the Tag changes Tag state (e.g., from State A to State B, or from State B to State A) (543) if the Tag is waiting to change state (541). In another embodiment, the Tag always assumes that the Reader receives the Tag data. The Tag changes its state from A to B, or from B to A, if a query command is received while it is waiting to change state after sending the Tag data. It is understood that operations 541 and 543 are performed before operation 507 or 509 is performed. Thus, after replying to a query for tags in state A and sending the Tag data, the tag in state A switches into state B and does not reply to a further query for tags in state A. To prevent the Tag from changing state, the Reader can broadcast a command to prevent state change (e.g., NAk) before another query command.

Figure 6:
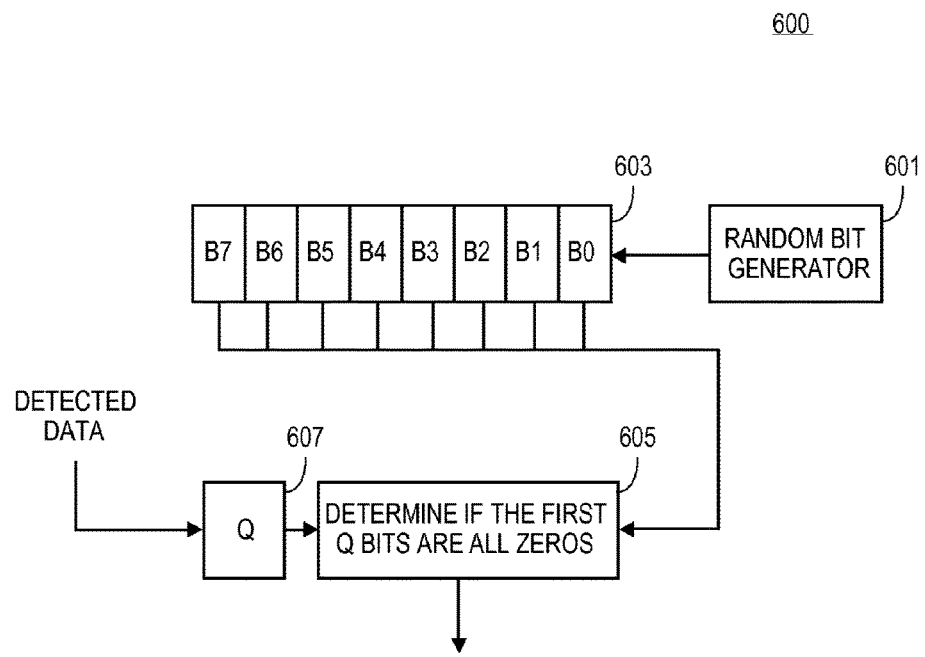
FIG. 6 shows an example of a decision making circuit for a Tag to randomly decide whether or not to reply to a query according to one embodiment of the present invention.

FIG. 6 shows an example of a decision making circuit for a Tag to randomly decide whether or not to reply to a query according to one embodiment of the present invention. A random bit generator (601) generates one bit of random information at a time. A number of random bits are stored in memory 603. For example, when a new bit of random information is generated, it is shifted into the memory so that the first bit in the memory contains the new bit of random information and the oldest bit of random information is discarded. When the Tag received the Q parameter from the Reader (e.g., in a QueryA command or a QueryB command), the value of the Q parameter is stored in memory 607. A logic circuit (605) determines if the first Q bits (e.g., the most recent Q bits) in memory 603 are all zeros. If the first Q bits in memory 603 are all zeros, the Tag decides to reply to the query. Otherwise, the Tag does not reply. When Q is zero, the Tag always decides to reply if the Tag is in the specified state.

In one embodiment, the random bit generator (601) has a probability of ($\frac{1}{2}$) to generate zeros. Thus, for a given Q value, the probability to reply is $(\frac{1}{2})^Q$. The random bit generator (601) may generate random bits at a rate of one bit per command, faster than one bit per command, or slightly slower than one bit per command. It is understood that different Tags may generate the random bits at different rates. Further, the random bit generator (601) may not generate zeros with a probability of (½). For example, important Tags may be biased to have a probability greater than ½ to generate zeros. Thus, these Tags are more likely to satisfy requirement that the first Q bits are all zeros. As a result, these Tags have a greater probability to reply earlier than other Tags.

From the above example, it is understood that the Tag can randomly decide to reply with a probability of replying controlled by the Q parameter. Different implementations can be used to achieve such controlled random decision-making. For example, it may be requested that the oldest Q bits in the memory are all ones. Since adjusting the value of the Q parameter can adjust the probability of replying, a Reader can adaptively adjust the Q value to increase the probability of getting a single legible reply from a large number of Tags that are in the range of the Reader.

Figure 7:
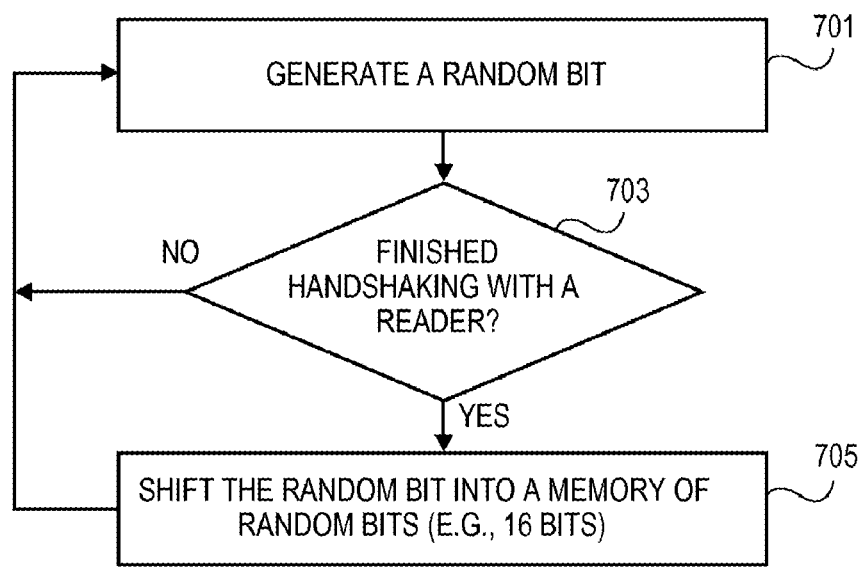
FIG. 7 is a flowchart showing a method for a Tag to generate random numbers for communication with a Reader according to one embodiment of the present invention.

FIG. 7 shows a flowchart representation of a method for a Tag to generate random numbers for communication with a Reader according to one embodiment of the present invention. Operation 701 generates a random bit (e.g., using a random bit generator 601). It is then determined whether the Tag has finished handshaking with a Reader (703). If the Tag is in the process of handshaking with the Reader, the random bit is not used to update the information in the memory (e.g. 603). Thus, the random number in the memory remains the same during the process of handshaking. In the process of handshaking, the Tag sends the content of the memory of random bits (e.g., 16-bit memory) to the Reader as the handshake data and receives a handshake command (e.g., Ack) with handshake data back from the Reader. If the handshake data received from the Reader matches the handshake data sent from and maintained at the Tag, handshaking is successful and the Tag can send the Tag data to the Reader in response. If the Reader does not send the handshake command again (or the handshake data does not match), the Tag finishes handshaking with the Reader (e.g., by sending another query command). When the Tag is not handshaking with the Reader, the Tag does not need to freeze the content of the memory of random bits. Thus, the Tag shifts the random bit into the memory of random bits (705) to update the content. Based on this description, a person skilled in the art can envision various alternative implementations. For example, the random bit may be generated only in response to a query command.

In one embodiment of the present invention, the entire content of the memory of random bits (e.g., 603) that is used for making the random decision is used as the handshake data. Alternatively, only a portion of it may be used as the handshake data. For example, when the Tag replies if the first Q bits are all zeros, the Tag may use only the last (16-Q) bits of the random bit memory as handshake data. Alternatively, the Tag may use other random numbers as the handshake data.

Figure 8:
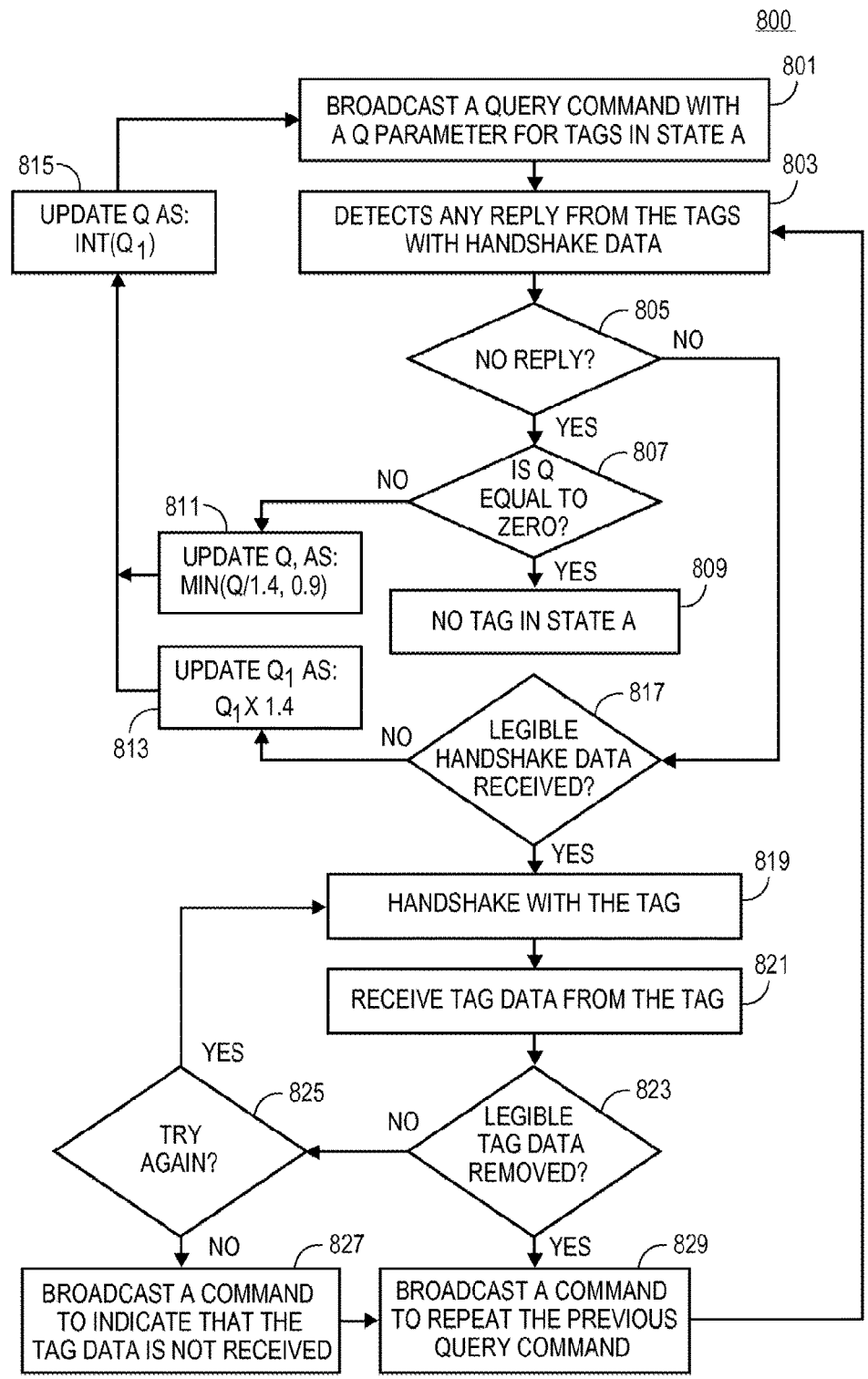
FIG. 8 is a flowchart showing a method for a Reader to read Tag data from a number of Tags according to one embodiment of the present invention.

FIG. 8 illustrates a flowchart representation of a method for a Reader to read Tag data from a number of Tags according to one embodiment of the present invention. After broadcasting a query command with a Q parameter for Tags in state A (801), a Reader detects any reply from the Tags with handshake data (803). When there is no reply (805), it is determined whether the Q parameter is already equal to zero. If the Q parameter is equal zero and no reply is received in response to the query command, it can be determined that there is no Tag in state A within range, since any Tag in state A receiving the query command will reply when the Q parameter is equal to zero. If the Q parameter is not already zero, the Reader can reduce the Q parameter to increase the probability of receiving a reply. For example, the Reader can maintain a parameter $Q_f$ as a floating-point number so that Q is determined from $Int(Q_f)$ (where $Int(x)$ indicates the integer portion of a real number x). The Reader can update $Q_f$ as $Min(Q_f/1.4, 0.9)$ (where $Min(x/a, b)$ indicates the minimum value between x/a and b), and update Q as $Int(Q)$ (811, 815), when there is no reply. When there are multiple replies from different Tags that corrupt each other, the Reader cannot obtain legible handshake data from the replies (817). To avoid collision, the Reader can increase the Q parameter to decrease the probability of receiving multiple replies. For example, the Reader can update $Q_f$ as $Q_f \times 1.4$ and update Q as $Int(Q)$ (813, 815) when multiple replies collide to corrupt each other.

Note that when the Reader can obtain legible handshake data from one reply, the Reader does not have to increase the Q parameter even if there is collision. For example, when a weak reply collides with a strong reply, the Reader can still obtain the handshake data from the strong reply. In this case, the Reader can simply ignore the weak reply and start to handshake with the Tag that sends the strong reply. Thus, hidden collisions improve performance, since weak Tags are protected by the ACK handshake and the stronger Tag is still counted if the Reader can extract its handshake.

After legible handshake data is received as reply to the query command (817), the Reader handshakes with the Tag that sends the handshake data (e.g., by broadcasting a command, such as Ack, with the handshake data). Then, the Reader tries to receive Tag data (e.g., Tag identification data, such as ePC) from the Tag (821). For example, if the Tag determines that the handshake data in the Ack command matches the handshake data sent from the Tag, the Tag transmits the Tag identification data as a reply to the Ack command. If the Tag receives legible Tag data (823), the Tag can broadcast a command to repeat the previous query command without re-broadcasting the parameters for the query (829). In response to the query command, the Tag that just sent the Tag data switches from state A to state B so that it does not respond to the query for Tags in state A. The Tags in state A use the previous query parameters for the current query. However, if the Tag data is not legible (823), the Reader may try again to handshake with the Tag (819) or broadcast a command to indicate that the Tag data is not received (827).

In one embodiment of the present invention, the Tag switches state in response to any query commands after transmitting the Tag data. Thus, after receiving the legible Tag data, the Reader can choose to broadcast a command to repeat the previous query or to broadcast a query command with new query parameters. Alternatively, the Tag can be implemented such that it switches state, after transmitting the Tag data, only in response to the command that repeats the previous query command (e.g., QueryRep). Thus, the Reader can use one QueryRep command to cause: 1) the Tag that has just sent the Tag data to switch state to leave the set of Tags to be interrogated; and 2) other Tags to be queried and to make random decisions about whether or not to reply to the query.

In one implementation of the present invention, system communication follows a two-stage command-reply pattern where the Reader initiates the transaction (Reader Talks First, RTF). In the first phase, the Reader provides power to one or more passive Tags with continuous wave (CW) RF energy. Tags power up, ready to process commands after receiving one command that is used for synchronization of their clocks. The Reader transmits information to the field by amplitude modulation using the Reader-to-Tag encoding scheme described below. On completion of the transmission, the Reader ceases modulation and maintains RF to power the Tags during the reply phase. Tags communicate with the Reader via backscatter modulation during this period using the four (4)-phase bit encoding scheme described below.

In one implementation, basic commands are designed to limit the amount of state information the Tags have to store between transactions. The power available to a passive Tag is a complicated function of transmitted power, Tag/Reader antenna orientations, local environment and external sources of interference. Tags on the margin of the RF field are powered unreliably and therefore cannot be counted on to maintain a memory of previous transactions with the Reader. In particular, moving Tags or objects may cause the Tag to have power only for brief intervals, primarily due to multi-path interference. In one implementation, it is designed to allow the efficient counting of Tags under these conditions by minimizing the total transaction time and by allowing rapid recovery from missed commands. Tags which have threshold power and receive three commands (e.g., a prior command to spin up on, a query, and an ACK with its reply) in as little as three milliseconds can be inventoried.

In one implementation, there is only one bit of state for each session, between command groups, and the impact of that state is further lessened by symmetrizing the command set about those two states, as described below.

In one implementation, each Tag has four sessions available, each with a single bit of independent state memory. The backscatter mode and data rate are the same for all of the sessions, and the random reply register is the same for all sessions. The state of being selected is also the same for all sessions. This session structure allows up to four Readers or processes to communicate with the Tag population in a multitasking environment, but they can do so with a complete command group. A command group starts with a QueryA/B (QueryRep does not start a command group), and continues through an ACK, and ends with either the command after the ACK (which completes the transaction from the Tag's point of view), or at the end of the use of the SELECTED state by a process.

One example of the use of two sessions is a portal Reader which is counting all Tags coming through a portal, but wants to preferentially count pallets. It could then run two simultaneous processes on the Tag population. Session 0, for example, could be used by one process to sweep the entire population of Tags between state A and state B to ensure counting all Tags that it touches once, regardless of their former state. Session 1 could selectively mask all pallet Tags to state A for that session and all other Tags to state B, and count them preferentially in an interleaved process, without interfering with the ongoing inventory in the first process.

A similar example would be a set of store inventory Readers set to synchronize their inventory type. For example, all inventory Readers would use Session 0 at the Tags to inventory from the A state to the B state for a ten second interval, and then inventory from the B state back to the A state. This ensures that all Tags are counted by one inventory Reader once per cycle. Simultaneously, a hand-held Reader could use session 1 to look for a specific ePC by masking a sufficient portion of that ePC to state A while masking all other Tags to state B. It then uses Session 1 QueryA commands to seek that Tag or Tag type. This avoids interference with the store inventory Readers as long as command groups do not collide (interleave) and as long as RF interference is avoided.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for operating an RFID reader, the method comprising:
    transmitting to a tag, a query command from a reader that is configured to store a first pair of keys including a first key and a second key, wherein the tag is configured to store a second pair of keys including a third key and a fourth key, and wherein the first pair of keys and the second pair of keys are used to create a sub-selection of a population of readers and tags;
    transmitting to the tag, the first key from the reader;
    receiving a first value from the tag if the first key from the reader matches the third key stored in the tag;
    encrypting the first value using the second key stored in the reader to obtain a second value;
    transmitting the second value to the tag that is configured to decrypt the second value using the fourth key to derive a challenge value;
    receiving an identifier from the tag if a comparison of the first value to the challenge value indicates that the first value matches the challenge value.

2. The method as in claim 1 wherein the first value is a random number generated by the tag and wherein the first key is received with the query command.

3. The method as in claim 1 wherein the second value is transmitted with a handshake command and wherein the query command is transmitted with a Q parameter which sets a probability for reply by the tag.

4. The method as in claim 1 wherein the second pair of keys are stored in a non-volatile memory in the tag.

5. The method as in claim 1 wherein the tag randomly decides whether to transmit the first value after verifying that the first key from the reader matches the third key stored in the tag.

6. The method as in claim 1 wherein the tag does not transmit the first value if the first key from the reader does not match the third key stored in the tag.

7. A machine readable non-transitory storage medium which contains executable instructions which when executed by a reader cause the reader to perform a method for operating an RFID reader, the method comprising:
    transmitting to a tag, a query command from the reader that is configured to store a first pair of keys including a first key and a second key, wherein the tag is configured to store a second pair of keys including a third key and a fourth key, and wherein the first pair of keys and the second pair of keys are used to create a sub-selection of a population of readers and tags;
    transmitting to the tag, the first key from the reader;
    receiving a first value from the tag if the first key from the reader matches the third key stored in the tag;
    encrypting the first value using the second key stored in the reader to obtain a second value;
    transmitting the second value to the tag that is configured to decrypt the second value using the fourth key to derive a challenge value;

receiving an identifier from the tag if a comparison of the first value to the challenge value indicates that the first value matches the challenge value.

8. The machine readable non-transitory storage medium of claim 7, wherein the first value is a random number generated by the tag and wherein the first key is received with the query command.

9. The machine readable non-transitory storage medium of claim 7, wherein the second value is transmitted with a handshake command and wherein the query command is transmitted with a Q parameter which sets a probability for reply by the tag.

10. The machine readable non-transitory storage medium of claim 7, wherein the second pair of keys are stored in a non-volatile memory in the tag.

11. The machine readable non-transitory storage medium of claim 7, wherein the tag randomly decides whether to transmit the first value after verifying that the first key from the reader matches the third key stored in the tag.

12. The machine readable non-transitory storage medium of claim 7, wherein the tag does not transmit the first value if the first key from the reader does not match the third key stored in the tag.

13. A reader, comprising:
a memory;
a transmitter and a receiver;
a processor coupled to the memory and to the transmitter and to the receiver, wherein the transmitter is configured to transmit a query command from the reader that is configured to store a first pair of keys including a first key and a second key, wherein the transmitter is configured to transmit the first key to a tag that is configured to store a second pair of keys including a third key and a fourth key, wherein the first pair of keys and the second pair of keys are used to create a sub-selection of a population of readers and tags, wherein the receiver is configured to receive a first value from the tag if the first key from the reader matches the third key stored in the tag, wherein the transmitter is configured to encrypt the first value using the second key stored in the reader to obtain a second value; wherein the transmitter is configured to transmit the second value to the tag that is configured to decrypt the second value using the fourth key to derive a challenge value; and
wherein the receiver is configured to receive an identifier from the tag if a comparison of the first value to the challenge value indicates that the first value matches the challenge value.

14. The reader of claim 13, wherein the first value is a random number generated by the tag and wherein the first key is received with the query command.

15. The reader of claim 13, wherein the second value is transmitted with a handshake command and wherein the query command is transmitted with a Q parameter which sets a probability for reply by the tag.

16. The reader of claim 13, wherein the second pair of keys are stored in a non-volatile memory in the tag.

17. The reader of claim 13, wherein the tag randomly decides whether to transmit the first value after verifying that the first key from the reader matches the third key stored in the tag.

18. The reader of claim 13, wherein the tag does not transmit the first value if the first key from the reader does not match the third key stored in the tag.

* * * * *